(12) United States Patent
Cha et al.

(10) Patent No.: US 11,412,197 B2
(45) Date of Patent: Aug. 9, 2022

(54) ELECTRONIC DEVICE INCLUDING IMAGE SENSOR

(71) Applicant: SAMSUNG ELECTRONICS CO., LTD., Suwon-si (KR)

(72) Inventors: Sung-Ho Cha, Anyang-si (KR); Sung Su Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/330,003

(22) Filed: May 25, 2021

(65) Prior Publication Data

US 2022/0046215 A1 Feb. 10, 2022

(30) Foreign Application Priority Data

Aug. 5, 2020 (KR) .................. 10-2020-0097880

(51) Int. Cl.
*H04N 5/225* (2006.01)
*H04N 5/232* (2006.01)
*H04N 5/235* (2006.01)
*H04N 9/73* (2006.01)
*H04N 9/77* (2006.01)

(52) U.S. Cl.
CPC ............ *H04N 9/77* (2013.01); *H04N 5/2258* (2013.01); *H04N 5/22525* (2018.08); *H04N 5/2351* (2013.01); *H04N 5/23232* (2013.01); *H04N 9/735* (2013.01)

(58) Field of Classification Search
CPC ........ H04N 9/3182; H04N 9/73; H04N 9/735; H04N 1/6077–6091; H04N 5/22525; H04N 5/2258; H04N 5/23229; H04N 5/23232; H04N 5/235–243; H04N 5/247
See application file for complete search history.

(56) References Cited

U.S. PATENT DOCUMENTS

| | | | |
|---|---|---|---|
| 5,619,260 | A | 4/1997 | Miyadera |
| 9,253,434 | B2 | 2/2016 | Boss et al. |
| 2011/0012997 | A1 | 1/2011 | Koguchi |
| 2014/0211041 | A1* | 7/2014 | Mccrackin ............. H04N 5/353 348/223.1 |
| 2020/0389575 | A1* | 12/2020 | Gove .................... H04N 5/2226 |
| 2021/0058568 | A1* | 2/2021 | Ivanov Bonev ......... H04N 5/33 |
| 2021/0152735 | A1* | 5/2021 | Zhou .................... G06N 3/0454 |
| 2021/0368081 | A1* | 11/2021 | Kim ..................... H04N 5/2257 |
| 2022/0086373 | A1* | 3/2022 | Lim ..................... H04N 5/2258 |

FOREIGN PATENT DOCUMENTS

| | | |
|---|---|---|
| JP | 2014-165608 A | 9/2014 |
| KR | 10-1888970 B1 | 8/2018 |
| KR | 10-2019-0026128 A | 3/2019 |
| KR | 10-2013331 B1 | 10/2019 |

* cited by examiner

*Primary Examiner* — Paul M Berardesca
(74) *Attorney, Agent, or Firm* — Sughrue Mion, PLLC

(57) ABSTRACT

An electronic device includes: a display; a first image sensor configured to output a first image signal based on sensing a first light passing through the display; a second image sensor configured to output a second image signal based on sensing a second light that does not pass through the display; and a processor configured to: generate a first optical value and a second optical value based on the second image signal, the second optical value being different from the first optical value; based on the first optical value satisfying a first condition, correct the first image signal by using the second optical value.

20 Claims, 16 Drawing Sheets

ELECTRONIC DEVICE INCLUDING IMAGE SENSOR

CROSS-REFERENCE TO RELATED APPLICATION

This application claims priority from Korean Patent Application No. 10-2020-0097880, filed on Aug. 5, 2020 in the Korean Intellectual Property Office, and all the benefits accruing therefrom under 35 U.S.C. 119, the disclosure of which is incorporated by reference herein in its entirety.

BACKGROUND

1. Field

The disclosure relates to an electronic device including an image sensor. More particularly, the disclosure relates to an electronic device including a plurality of image sensors and an image signal processor.

2. Description of Related Art

An image sensing device is a semiconductor device that converts optical information into an electrical signal. Examples of the image sensing device may include a charge coupled device (CCD) image sensing device and a complementary metal oxide semiconductor (CMOS) image sensing device.

A CMOS image sensor (CIS) may include a plurality of pixels arranged two-dimensionally. Each of the plurality of pixels may include, for example, a photodiode (PD). The photodiode may serve to convert incident light into an electrical signal.

In recent years, with the development of the computer industry and the telecommunications industry, demands for image sensors with improved performance have been increased in various fields, such as digital cameras, camcorders, smartphones, game devices, security cameras, medical micro cameras, robots, autonomous vehicles, drones, and the like.

Recently, an image sensor disposed under a display panel of an electronic device is provided. As the image sensor senses light passing through the display panel, information on the sensed light may be different from information on actual light. For example, the quality of an image outputted by the image sensor, which senses light passed through the display panel, may be deteriorated compared to the quality of an image outputted by an image sensor which senses light not passed through the display panel. Therefore, a method for solving this problem is needed in the image sensor that is disposed under a display panel of an electronic device.

SUMMARY

One or more example embodiments of the disclosure provide an electronic device including an image sensor and a processor, in which product reliability is improved by reducing deterioration in image quality.

One or more example embodiments of the disclosure also provide an electronic device including an image sensor and a processor, in which product reliability is improved by enhancing image quality.

However, aspects of the disclosure are not restricted to those set forth herein. The above and other aspects of the disclosure will become more apparent to one of ordinary skill in the art to which the disclosure pertains by referencing the detailed description of the disclosure given below.

According to an aspect of an example embodiment, there is provided is an electronic device including: a display; a first image sensor configured to output a first image signal based on sensing a first light passing through the display; a second image sensor configured to output a second image signal based on sensing a second light that does not pass through the display; and a processor configured to: generate a first optical value and a second optical value based on the second image signal, the second optical value being different from the first optical value; based on the first optical value satisfying a first condition, correct the first image signal by using the second optical value.

The first optical value may include at least one of a luminance value or an illuminance value generated based on the second image signal, and the second optical value may include a color temperature value generated based on the second image signal.

The processor may be further configured to, based on the first optical value satisfying the first condition and further based on the color temperature value being less than a first color temperature or being equal to or greater than a second color temperature, correct the first image signal by using the color temperature value, the second color temperature being higher than the first color temperature.

The processor may be further configured to generate a third optical value and a fourth optical value based on the first image signal, the fourth optical value being different from the third optical value.

The third optical value may include at least one of a luminance value or an illuminance value generated based on the first image signal, and the fourth optical value may include a color temperature value generated based on the first image signal.

The first condition may be that the first optical value is equal to or greater than a threshold value.

The processor may be further configured to, based on the first optical value not satisfying the first condition, correct the first image signal by using an optical value generated based on the first image signal.

The optical value generated based on the first image signal may include a color temperature value generated based on the first image signal.

The first condition may be that a difference between the first optical value and the third optical value is less than a threshold value.

The processor may be further configured to, based on the difference between the first optical value and the third optical value is equal to or greater than the threshold value, correct the first image signal by using an optical value generated based on the first image signal.

The display may be further configured to output an image generated based on the corrected first image signal.

The processor may be further configured to output a third image signal by performing auto white balance on the first image signal, and the processor may be further configured to, based on the first optical value satisfying a second condition, output a fourth image signal obtained by correcting the third image signal using the second optical value.

The display may be further configured to output an image generated based on at least one of the third image signal and the fourth image signal.

According to an aspect of an example embodiment, there is provided an electronic device, including: a first image sensor configured to output a first image signal based on sensing a first light incident to a front surface of the electronic device; a second image sensor configured to output a second image signal based on sensing a second light incident to a rear surface of the electronic device; a processor configured to receive the first image signal and the second image signal; and a display disposed on the front surface and configured to output an image generated based on the first image signal, wherein the processor is further configured to generate a first color temperature value based on the second image signal, and based on a first condition being satisfied, correct the first image signal by using the first color temperature value.

The display may be further configured to cover the first image sensor.

The processor may be further configured to generate a second color temperature value based on the first image signal, and generate at least one of a luminance value or an illuminance value based on the second image signal.

The first condition may be that the at least one of the luminance value or the illuminance value is equal to or greater than a threshold value.

The processor may be further configured to, based on the first condition not being satisfied, correct the first image signal by using the second color temperature value.

The display may be further configured to output an image generated based on the corrected first image signal.

According to an aspect of an example embodiment, there is provided an electronic device including: a display; a first camera module including a first image sensor, the first image sensor configured to output a first image signal based on sensing a first light passing through the display; a second camera module including a second image sensor, the second image sensor configured to output a second image signal based on sensing a second light that does not pass through the display; and an application processor disposed separately from the first camera module and the second camera module, and including an image signal processor, wherein the image signal processor is configured to: receive the first image signal from the first camera module through a first camera serial interface; receive the second image signal from the second camera module through a second camera serial interface; generate a first color temperature value based on the first image signal; generate, based on the second image signal, at least one of a luminance value or an illuminance value, and a second color temperature value; and correct the first image signal based on the second color temperature value based on the at least one of the luminance value or the luminance value being equal to or greater than a threshold value, and correct the first image signal based on the first color temperature value based on the at least one of the luminance value or the illuminance value being less than the threshold value.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Hereinafter, example embodiments of the disclosure will be described with reference to the accompanying drawings.

Hereinafter, an electronic device including a first image sensor and a second image sensor will be described with reference to FIGS. 1 to 4.

Figure 1:
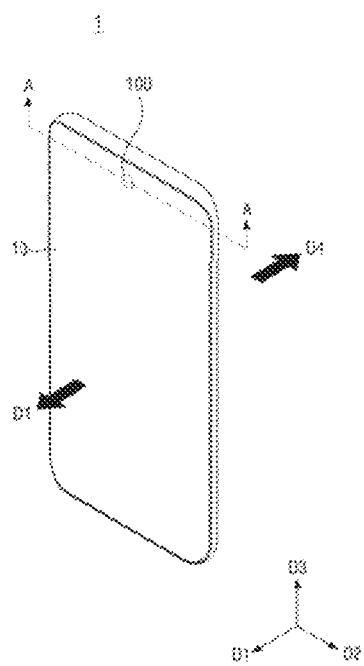
FIG. 1 is a perspective view illustrating an electronic device according to some example embodiments.
Figure 2:
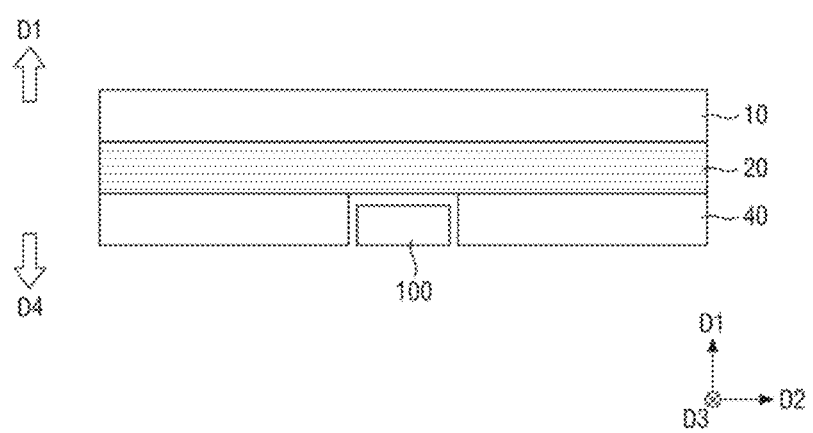
FIG. 2 is a partial cross-sectional view of the electronic device taken along line A-A of FIG. 1.
Figure 3:
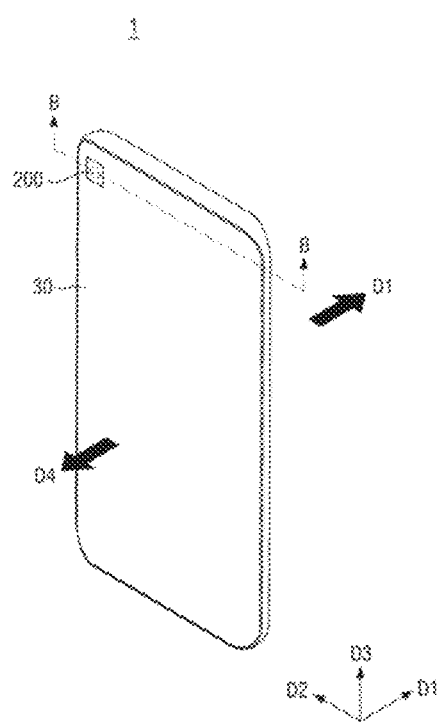
FIG. 3 is a perspective view of the electronic device of FIG. 1 as viewed in a first direction.
Figure 4:
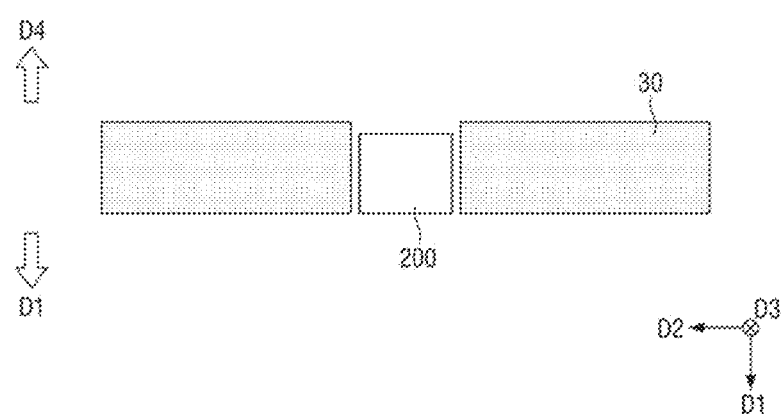
FIG. 4 is a partial cross-sectional view of the electronic device taken along line B-B of FIG. 3.

FIG. 1 is a perspective view illustrating an electronic device according to some example embodiments. FIG. 2 is a partial cross-sectional view of the electronic device taken along line A-A of FIG. 1. FIG. 3 is a perspective view of the electronic device of FIG. 1 as viewed in a first direction. FIG. 4 is a partial cross-sectional view of the electronic device taken along line B-B of FIG. 3.

Referring to FIGS. 1 to 4, an electronic device 1 may include a cover glass 10, a display 20, a rear glass 30, a back cover 40, a first image sensor 100, a second image sensor 200, and the like.

In some example embodiments, the electronic device 1 may include a housing. For example, the housing may include the cover glass 10 that faces a first direction D1 and the rear glass 30 that faces a fourth direction D4 opposite to the first direction D1. Further, the housing may include, for example, a connection part that connects the cover glass 10 to the rear glass 30. The housing may be used to protect components inside the electronic device 1 from an external impact.

The cover glass 10 may include a transparent material so that electrical information signals displayed by the display 20 may be recognized from the outside. For example, the cover glass 10 may include glass or plastic.

The cover glass 10 and the rear glass 30 may have a flat shape. For example, each of the cover glass 10 and the rear glass 30 may have a length in a second direction D2 and a length in a third direction D3, which are greater than a length or thickness in the first direction D1. Accordingly, the electronic device 1 may have a flat shape. However, example embodiments according to the technical spirit of the disclosure are not limited thereto.

The surface of the electronic device 1 facing the first direction D1 may be a front surface of the electronic device 1, and the surface of the electronic device 1 facing the fourth direction D4 may be a rear surface of the electronic device 1. However, this is merely an example and example embodiments according to the technical spirit of the disclosure are not limited.

Referring to FIGS. 1 and 2, the cover glass 10 may cover the display 20. For example, the display 20 may be disposed in the fourth direction D4 from the cover glass 10.

The display 20 may include a plurality of pixels arranged along rows and columns. For example, the display 20 may include an organic light emitting diode display (OLED), a liquid crystal display (LCD), a plasma display panel (PDP), an electrochromic display (ECD), a digital mirror device (DMD), an actuated mirror device (AMD), a grating light value (GLV) device, an electroluminescent display (ELD), and the like.

The display 20 may output an image provided from the electronic device 1. For example, signals are transmitted to the plurality of pixels and the display 20 may output a corresponding image based on the signals. For example, the display 20 may include a touch screen or a touch panel that displays images and/or receives an input by a user's touch.

The first image sensor 100 may sense light incident through the display 20 from the outside of the electronic device 1 and/or a part of light outputted from the display 20. For example, the first image sensor 100 may be covered by the display 20 and may sense light, which is incident from the outside of the electronic device 1, in the electronic device 1. For example, the first image sensor 100 may sense light outputted from the display 20 and reflected by the cover glass 10.

For example, the first image sensor 100 may sense lights from the cover glass 10 and the pixels of the display 20, and light passed through a gap between the pixels of the display 20.

Accordingly, a luminance value and a color temperature value of the light passed through the display 20 may be changed by the cover glass 10 and the pixels of the display 20. For example, the luminance value and the color temperature value, which are generated as a result of processing a signal outputted by sensing the light passed through the display 20 by the first image sensor 100, may be smaller than the actual luminance value and color temperature value. However, embodiments of the disclosure are not limited thereto.

Further, according to some example embodiments, the luminance value may be used together with the illuminance value, or the illuminance value may be used instead of the luminance value. Hereinafter, in example embodiments according of the disclosure, it is described that the luminance value is used, but the illuminance value may also be used in the same manner as the luminance value.

The first image sensor 100 may be covered by the display 20, and surrounded by the back cover 40. For example, the first image sensor 100 may be disposed in an opening formed in the back cover 40.

The back cover 40 may prevent light generated inside the electronic device 1 from affecting the display 20. Further, the back cover 40 may prevent light outputted from the display 20 from entering the inside of the electronic device 1.

Although it is not shown in FIG. 2, the rear glass 30 may be disposed on the back cover 40 and the first image sensor 100 in the fourth direction D4 and protect the back cover 40 and the first image sensor 100 from an external impact.

Referring to FIGS. 3 and 4, the rear glass 30 may be disposed at the rear surface (e.g., the surface of the electronic device 1 in the fourth direction D4) of the electronic device 1. Further, the second image sensor 200 may be disposed at the rear surface (e.g., the surface of the electronic device 1 in the fourth direction D4) of the electronic device 1. However, embodiments of the disclosure are not limited thereto, and the second image sensor 200 may be disposed at any other locations in the electronic device 1, e.g., a side surface or the front surface of the electronic device 1.

The rear glass 30 may be disposed to surround the second image sensor 200. For example, the second image sensor 200 may be disposed in an opening formed in the rear glass 30. A surface of the second image sensor 200 may face the fourth direction D4. For example, the second image sensor 200 may have a light receiver that face the fourth direction D4 (e.g., the direction toward the rear surface).

The second image sensor 200 may sense light incident on the rear surface of the electronic device 1. For example, the second image sensor 200 may sense light that does not pass through the display 20 disposed on the front surface of the electronic device 1. That is, while the first image sensor 100 senses the light passed through the display 20, the light receiver of the second image sensor 200 may sense the light that does not pass through the display 20 because the light receiver of the second image sensor 200 that faces the fourth direction D4 (e.g., the direction toward the rear surface) it is not covered by the display 20 or another component of the electronic device 1.

Although one second image sensor 200 is illustrated, the second image sensor 200 may include a plurality of image sensors. For example, the second image sensor 200 may include a regular camera, a wide-angle camera, and a telephoto camera.

The rear glass 30 may prevent light from entering the electronic device 1 from the outside. That is, it is possible to prevent light from entering portions other than the opening of the rear glass 30 in which the second image sensor 200 is disposed.

Although it is not shown in FIG. 3, the cover glass 10, the display 20, and the back cover 40 may be disposed on the rear glass 30 in the first direction D1.

Hereinafter, an image sensing system 2 including the first image sensor 100, the second image sensor 200, and an application processor 300 will be described with reference to FIGS. 5 to 9.

Figure 5:
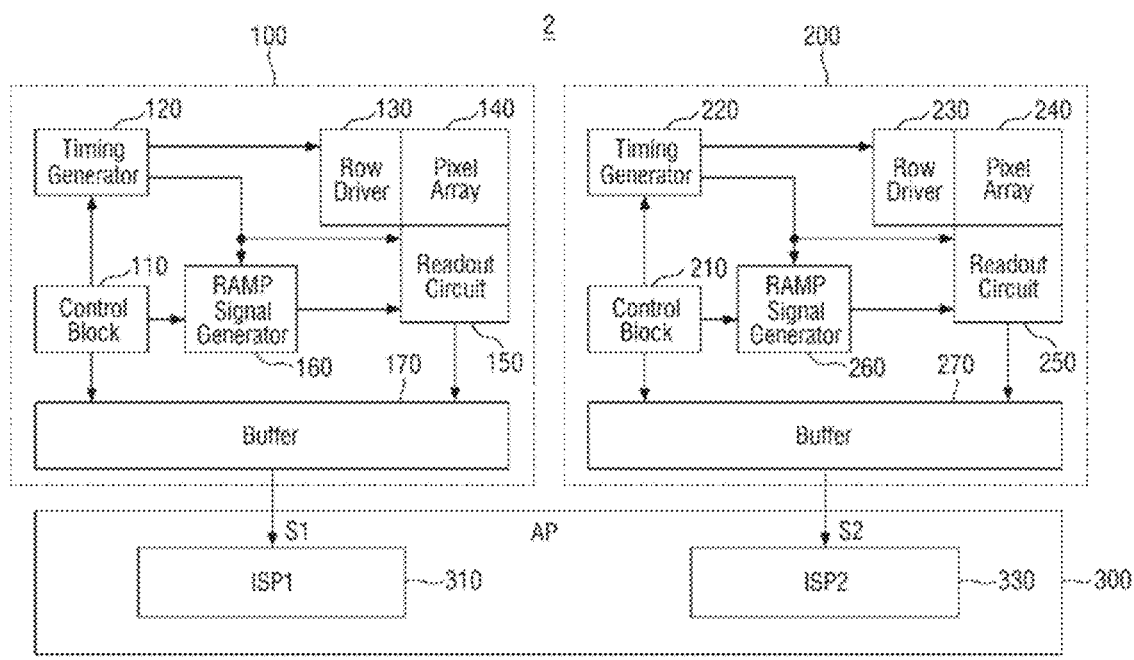
FIG. 5 is a block diagram illustrating an image sensing system according to some example embodiments.

FIG. 5 is a block diagram illustrating an image sensing system according to some example embodiments.

Referring to FIG. 5, the image sensing system 2 may include the first image sensor 100, the second image sensor 200, and the application processor 300.

The first image sensor 100 may generate a first image signal S1 by sensing an image of a sensing target using incident light. For example, the first image sensor 100 may sense light passed through the display 20 and generate the first image signal S1.

The second image sensor 200 may generate a second image signal S2 by sensing an image of a sensing target using incident light. For example, the second image sensor 200 may generate the second image signal S2 by sensing the light that does not pass through the display 20.

The first image signal S1 and the second image signal S2 may be provided to and processed by the application processor (AP) 300. For example, the first image signal S1 may be provided to and processed by a first image signal processor 310 of the AP 300, and the second image signal S2 may be provided to and processed by a second image signal processor 330 of the AP 300. However, embodiments according of the disclosure are not limited thereto. For example, the first image signal processor 310 and the second image signal processor 330 may be implemented as one image signal processor.

The first image signal processor 310 may receive the first image signal S1 outputted from a buffer 170 of the first image sensor 100, and process the received first image signal S1 to be suitable for display.

The second image signal processor 330 may receive the second image signal S2 outputted from a buffer 270 of the second image sensor 200, and process the received second image signal S2 to be suitable for display.

In some example embodiments, the first image signal processor 310 and the second image signal processor 330 may perform digital binning on the first image signal S1 and the second image signal S2, respectively. The first and second image signals S1 and S2 may respectively be raw image signals from pixel arrays 140 and 240, on which analog binning has not performed, or may respectively be the first and second image signals S1 and S2 on which the analog binning has been performed.

In some example embodiments, the first and second image sensors 100 and 200, and the application processor 300 may be disposed to be separate from each other. For example, the first and second image sensors 100 and 200 may be mounted on a first chip, and the application processor 300 may be mounted on a second chip, and the first and second image sensors 100 and 200 may communicate with the application processor 300 through an interface. However, example embodiments of the disclosure are not limited thereto. For example, the first and second image sensors 100 and 200, and the application processor 300 may be implemented in one package, for example, a multi-chip package (MCP).

The first image sensor 100 may include a control register block 110, a timing generator 120, a row driver 130, the pixel array 140, a readout circuit 150, a ramp signal generator 160, and the buffer 170.

The control register block 110 may control the overall operation of the image sensor 100. In particular, the control register block 110 may directly transmit operation signals to the timing generator 120, the ramp signal generator 160 and the buffer 170.

The timing generator 120 may generate a reference signal for operation timing of various components of the image sensor 100. The reference signal for operation timing generated by the timing generator 120 may be transmitted to the row driver 130, the readout circuit 150, the ramp signal generator 160, and the like.

The ramp signal generator 160 may generate and transmit a ramp signal used in the readout circuit 150. For example, the readout circuit 150 may include a correlated double sampler (CDS), a comparator, and the like, and the ramp signal generator 160 may generate and transmit the ramp signal used in the correlated double sampler (CDS), the comparator, and the like.

The buffer 170 may include, for example, a latch unit. The buffer 170 may temporarily store the first image signal S1 to be provided to the outside, and transmit the first image signal S1 to an external memory or an external device.

The pixel array 140 may sense an external image. The pixel array 140 may include a plurality of pixels (or unit pixels). The row driver 130 may selectively activate a row of the pixel array 140. The pixel array 140 may acquire light incident through the display 20.

The readout circuit 150 may sample a pixel signal provided from the pixel array 140, compare the sampled pixel signal with the ramp signal, and convert an analog image signal (data) into a digital image signal (data) based on the comparison result.

Figure 6:
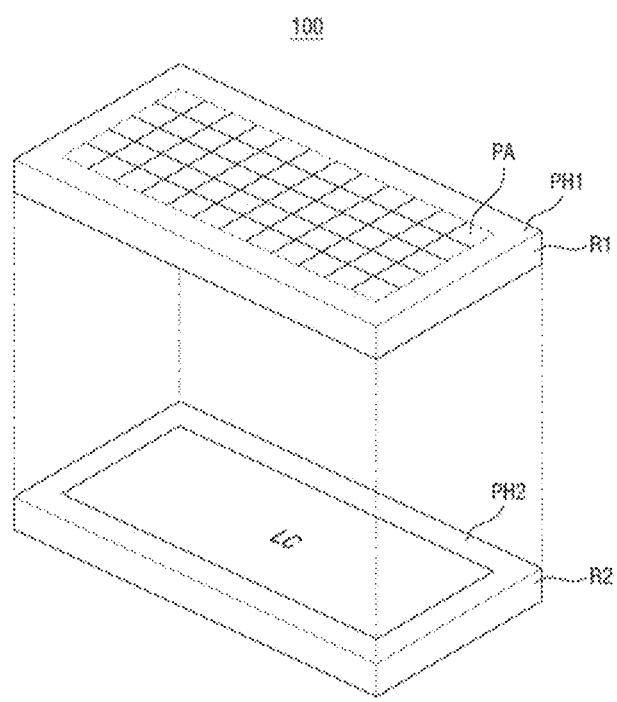
FIG. 6 is a diagram for describing a conceptual layout of the image sensor of FIG. 5.

FIG. 6 is a diagram for describing a conceptual layout of the image sensor of FIG. 5.

Referring to FIG. 6, the first image sensor 100 may include a first region R1 and a second region R2 stacked in a first direction (e.g., vertical direction). As illustrated, the first and second regions R1 and R2 may extend in a second direction (e.g., horizontal direction) intersecting the first direction, and a third direction intersecting the first and second directions. The blocks illustrated in FIG. 5 may be disposed in the first and second regions R1 and R2.

Although not shown in the drawing, a third region in which a memory is arranged may be disposed on or under the second region R2. In this case, the memory disposed in the third region may receive image data from the first and second regions R1 and R2, store or process the image data, and retransmit the image data to the first and second regions R1 and R2. In this case, the memory may include a memory element, such as a dynamic random access memory (DRAM), a static random access memory (SRAM), a spin transfer torque magnetic random access memory (STT-MRAM), and a flash memory. When the memory includes, for example, a DRAM, the memory may receive and process the image data at a relatively high speed. Further, in some example embodiments, the memory may be disposed in the second region R2.

The first region R1 may include a pixel array area PA and a first peripheral area PH1, and the second region R2 may include a logic circuit area LC and a second peripheral area PH2. The first and second regions R1 and R2 may be sequentially stacked vertically.

In the first region R1, the pixel array area PA may be an area in which the pixel array (e.g., 140 of FIG. 5) is disposed. The pixel array area PA may include a plurality of unit pixels arranged in a matrix. Each pixel may include a photodiode and transistors.

The first peripheral area PH1 may include a plurality of pads and may be disposed around the pixel array area PA. The plurality of pads may transmit and/or receive electrical signals to and/or from the external device.

In the second region R2, the logic circuit area LC may include electronic elements having a plurality of transistors. The electronic elements included in the logic circuit area LC may be electrically connected to the pixel array area PA to provide a signal to each unit pixel PX of the pixel array area PA or control an output signal of each unit pixel PX.

In the logic circuit area LC, for example, the control register block 110, the timing generator 120, the row driver 130, the readout circuit 150, the ramp signal generator 160 and the buffer 170 described with reference to FIG. 5 may be disposed. For example, among the blocks of FIG. 5, blocks other than the pixel array 140 may be disposed in the logic circuit area LC.

Also, in the second region R2, the second peripheral area PH2 may be disposed in an area corresponding to the first peripheral area PH1 of the first region R1, but embodiments are not limited thereto. The second peripheral area PH2 may include a plurality of pads, which may transmit and/or receive electrical signals to and/or from the external device.

In the above, the first image sensor 100 has been described, but the same or similar description may be also applied to the second image sensor 200. For example, the configuration and operation of the control register block 110, the timing generator 120, the row driver 130, the pixel array 140, the readout circuit 150, the ramp signal generator 160 and the buffer 170 of the first image sensor 100 may be substantially the same as or similar to the configuration and operation of a control register block 210, a timing generator 220, a row driver 230, the pixel array 240, a readout circuit 250, a ramp signal generator 260 and the buffer 270 of the second image sensor 200.

Further, in the logic circuit area LC of the second image sensor 200, one or more of the control register block 210, the timing generator 220, the row driver 230, the readout circuit 250, the ramp signal generator 260, the buffer 270 and the like may be disposed.

However, there is a difference between the first image sensor 100 and the second image sensor 200 in that the first image sensor 100 outputs the first image signal S1, and the second image sensor 200 outputs the second image signal S2. Further, the pixel array 240 is different from the pixel array 140 in that the pixel array 240 may acquire light that does not pass through the display 20.

Figure 7:
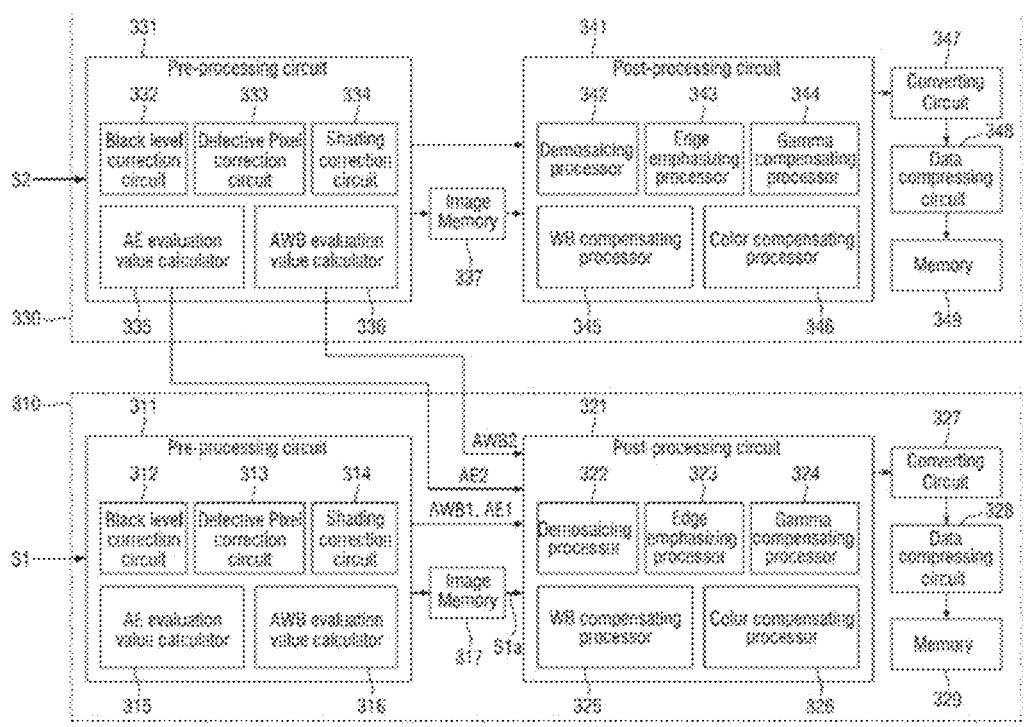
FIG. 7 is a block diagram illustrating a first image signal processor and a second image signal processor of FIG. 5.

FIG. 7 is a block diagram illustrating a first image signal processor and a second image signal processor of FIG. 5.

Referring to FIG. 7, the first image signal processor 310 may receive the first image signal S1 from the first image sensor 100. The second image signal processor 330 may receive the second image signal S2 from the second image sensor 200.

The first image signal processor 310 may include a pre-processing circuit 311, an image memory 317, a post-processing circuit 321, a converting circuit 327, a data compressing circuit 328, and a memory 329. The second image signal processor 330 may include a pre-processing circuit 331, an image memory 337, a post-processing circuit 341, a converting circuit 347, a data compressing circuit 348, and a memory 349.

In some example embodiments, the pre-processing circuit 311 may perform pre-processing on the first image signal S1. The pre-processing circuit 311 may include a black level correction circuit 312, a defective pixel correction circuit 313, a shading correction circuit 314, an auto exposure (AE) evaluation value calculator 315, and an auto white balance (AWB) evaluation value calculator 316.

The first image signal S1 outputted from the first image sensor 100 may be corrected so that the black level may become constant through black level correction processing by the black level correction circuit 312. Information on the first image signal S1 may be interpolated by the defective pixel correction circuit 313 based on information around a defective pixel when a pixel defect exists in the first image signal S1. Further, in the first image signal S1, a luminance difference between pixels, which is caused due to luminance omission occurring around a pixel, may be corrected by the shading correction circuit 314.

The AE evaluation value calculator 315 may calculate an AE evaluation value AE1 based on a first conversion signal S1a that has been subjected to the corrections by the black level correction circuit 312, the defective pixel correction circuit 313, and the shading correction circuit 314. For example, the AE evaluation value calculator 315 may calculate the AE evaluation value AE1 representing a brightness obtained by integrating a luminance value sensed by the first image sensor 100. For example, the AE evaluation value AE1 may include the luminance value sensed by the first image sensor 100.

The AWB evaluation value calculator 316 may calculate an AWB evaluation value AWB1 using a specific algorithm based on the AE evaluation value AE1 and the first conversion signal S1a that has been subjected to the corrections by the black level correction circuit 312, the defective pixel correction circuit 313, and the shading correction circuit 314. For example, the AWB evaluation value AWB1 may include a white balance gain to be used in white balance compensation processing. For example, the AWB evaluation value AWB1 may include a color temperature value sensed by the first image sensor 100.

In this case, the color temperature value means that the color of the sensed light is represented as a temperature. For example, in the case of red light, the color temperature value may be about 2,000 K, and in the case of blue light, the color temperature value may be about 10,000 K, but embodiments of the disclosure are not limited thereto.

The first conversion signal S1a that has been subjected to the corrections by the black level correction circuit 312, the defective pixel correction circuit 313, and the shading correction circuit 314; the AE evaluation value AE1 outputted from the AE evaluation value calculator 315; and the AWB evaluation value AWB1 outputted from the AWB evaluation value calculator 316 may be temporarily stored in the image memory 317 and transmitted to the post-processing circuit 321.

However, the embodiments of the disclosure are not limited thereto, and the first conversion signal S1a, the AE evaluation value AE1, and the AWB evaluation value AWB1 may be transmitted to the post-processing circuit 321 without being stored in the image memory 317.

The post-processing circuit 321 may perform post-processing on the first conversion signal S1a which has been pre-processed by the pre-processing circuit 311. The post-processing circuit 321 may include a demosaicing processor 322, an edge emphasizing processor 323, a gamma compensating processor 324, a white balance compensating processor 325, a color compensating processor 326, and the like.

The demosaicing processor 322 may perform demosaic processing (e.g., Bayer color interpolation processing) on the first conversion signal S1a transmitted from the pre-processing circuit 311. The edge emphasizing processor 323 may perform edge emphasizing processing on the first conversion signal S1a transmitted from the pre-processing circuit 311. The gamma compensating processor 324 may perform gamma compensation on the first conversion signal S1a transmitted from the pre-processing circuit 311.

The white balance compensating processor 325 may receive the first conversion signal S1a and the AWB evaluation value AWB1 from the pre-processing circuit 311. The white balance compensating processor 325 may perform white balance compensation processing on the first conversion signal S1a using the white balance gain of the AWB evaluation value AWB1.

The color compensating processor 326 may receive the first conversion signal S1a and the AWB evaluation value AWB1 from the pre-processing circuit 311. The color compensating processor 326 may perform color compensation processing on the first conversion signal S1a using the color temperature value sensed by the first image sensor 100 and included in the AWB evaluation value AWB1. Further, the color compensating processor 326 may perform color compensation processing on the signal that has been subjected to the white balance compensation processing by using the color temperature value sensed by the first image sensor 100 and included in the AWB evaluation value AWB1.

However, embodiments of the disclosure are not limited thereto, and the color compensating processor 326 may perform the color compensation by using other methods.

The first conversion signal S1a that has been post-processed by the post-processing circuit 321 may be transmitted to the converting circuit 327. The converting circuit 327 may convert an RGB image signal into a YCbCr (YCC) image signal. Through the conversion processing, a color space of the captured image may be converted from a RGB color space to a YCC (YCrCb) color space.

The YCC image signal converted by the converting circuit 327 may be transmitted to the data compressing circuit 328. The data compressing circuit 328 may compress the YCC image signal using a compression format, such as joint photographic experts group (JPEG). The compressed YCC image signal may be stored in the memory 329. Alternatively, the compressed YCC image signal may be processed by the application processor 300 and the processed image may be outputted through the display 20.

Although the first image signal processor 310 and the components included therein have been described as an example, the same or similar description may be applied to the second image signal processor 330. That is, the configuration and operation of the pre-processing circuit 311, the image memory 317, the post-processing circuit 321, the converting circuit 327, the data compressing circuit 328, and the memory 329 of the first image signal processor 310 may be the same as or substantially similar to the configuration and operation of a pre-processing circuit 331, an image memory 337, a post-processing circuit 341, a converting circuit 347, a data compressing circuit 348, and a memory 349 of the second image signal processor 330.

However, there is a difference between the first image signal processor 310 and the second image signal processor 330 in that the first image signal processor 310 processes the first image signal S1 to generate data, while the second image signal processor 330 processes the second image signal S2 to generate data. That is, the first image signal processor 310 may process the first image signal S1 outputted by sensing the incident light passed through the display 20, while the second image signal processor 330 may process the second image signal S2 outputted by sensing the incident light without passing through the display 20.

For example, the pre-processing circuit 331 of the second image signal processor 330 may receive the second image signal S2.

An AE evaluation value calculator 335 of the pre-processing circuit 331 may calculate an AE evaluation value AE2 based on a signal that has been subjected to corrections by a black level correction circuit 332, a defective pixel correction circuit 333, and a shading correction circuit 334. For example, the AE evaluation value calculator 335 may calculate the AE evaluation value AE2 representing a brightness obtained by integrating a luminance value sensed by the second image sensor 200. For example, the AE evaluation value AE2 may include the luminance value sensed by the second image sensor 200.

The AE evaluation value calculator 335 may transmit the calculated AE evaluation value AE2 to the post-processing circuit 321 of the first image signal processor 310.

An AWB evaluation value calculator 336 may calculate an AWB evaluation value AWB2 using a specific algorithm based on the AE evaluation value AE2 and the signal that has been subjected to the corrections by the black level correction circuit 332, the defective pixel correction circuit 333, and the shading correction circuit 334. For example, the AWB evaluation value AWB2 may include a white balance gain to be used in white balance compensation processing.

For example, the AWB evaluation value AWB2 may include a color temperature value sensed by the second image sensor 200.

The AWB evaluation value calculator 336 may transmit the calculated AWB evaluation value AWB2 to the post-processing circuit 321 of the first image signal processor 310.

In the drawing, the first image signal processor 310 and the second image signal processor 330 are illustrated as being separate from each other, but this is for the purpose of description only and the disclosure is not limited thereto. For example, the AE evaluation values AE1 and AE2, and the AWB evaluation values AWB1 and AWB2 may be generated and shared by one processor (e.g., application processor 300).

Hereinafter, the post-processing circuit 321 of FIG. 7 will be described in more detail with reference to FIG. 8.

Figure 8:
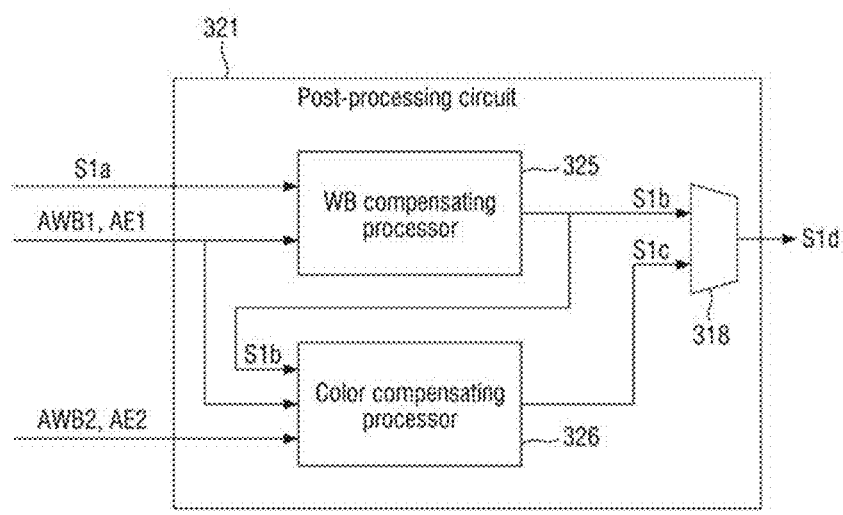
FIG. 8 is a block diagram illustrating a post-processing circuit of FIG. 7.

FIG. 8 is a block diagram illustrating a post-processing circuit of FIG. 7.

In some embodiments, the post-processing circuit 321 may include the white balance compensating processor 325 and the color compensating processor 326.

The first conversion signal S1a transmitted to the post-processing circuit 321 may be the signal transmitted from the pre-processing circuit 311, or a signal obtained by compensating the signal, which is transmitted from the pre-processing circuit 311, via the demosaicing processor 322, the edge emphasizing processor 323 and the gamma compensating processor 324.

The white balance compensating processor 325 may generate the second conversion signal S1b by performing the white balance compensation processing on the first conversion signal S1a using the white balance gain of the AWB evaluation value AWB1. The white balance compensating processor 325 may transmit the generated second conversion signal S1b to a first determining unit 318.

The color compensating processor 326 may receive the second conversion signal S1b from the white balance compensating processor 325. However, embodiments according of the disclosure are not limited thereto, and the color compensating processor 326 may receive the first conversion signal S1a, which is not white balance compensated, instead of the second conversion signal S1b.

The color compensating processor 326 may receive the AE evaluation value AE2 and the AWB evaluation value AWB2 from the second image signal processor 330. For example, the color compensating processor 326 may receive, from the pre-processing circuit 331, the AE evaluation value AE2 and the AWB evaluation value AWB2 of the signal that is sensed and outputted by the second image sensor 200.

The color compensating processor 326 may generate a third conversion signal S1c by performing the color compensation processing based on at least one of the received AE evaluation values AE1 and AE2, AWB evaluation values AWB1 and AWB2, and second conversion signal S1b. The color compensating processor 326 may transmit the generated third conversion signal S1c to the first determining unit 318.

The first determining unit 318 may select and output at least one of the received second conversion signal S1b and third conversion signal S1c. For example, a fourth conversion signal S1d may include at least one of the second conversion signal S1b and the third conversion signal S1c. The fourth conversion signal S1d may be transmitted to other components of the application processor 300. For example, image data processed using the fourth conversion signal S1*d* may be outputted to the display 20.

Hereinafter, the post-processing circuit 321 of FIG. 8 will be described in more detail with reference to FIGS. 9 to 12.

Figure 9:
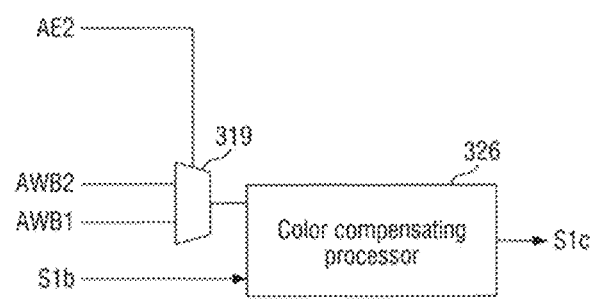
FIG. 9 is a block diagram illustrating the post-processing circuit of FIG. 8.
Figure 10:
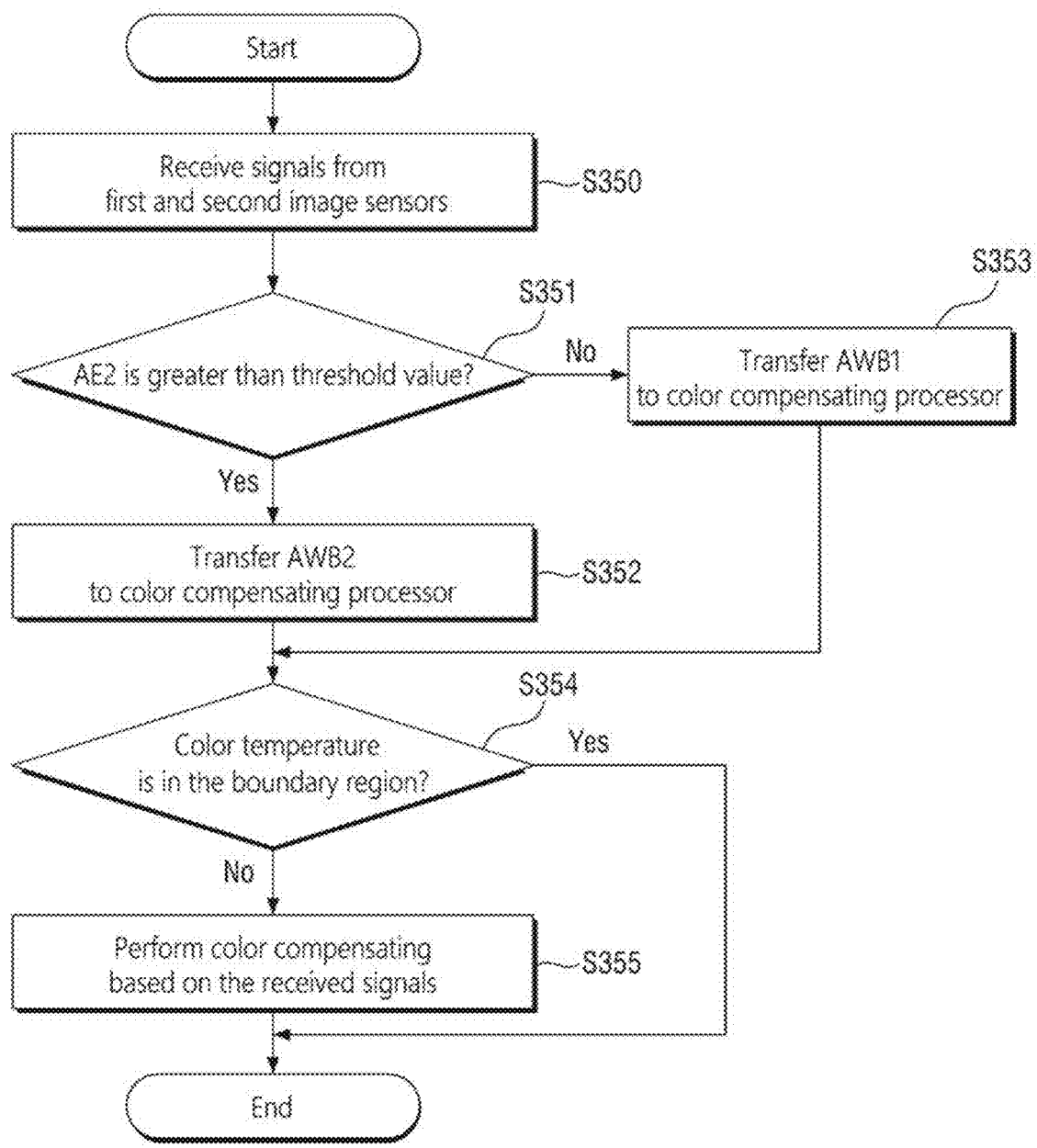
FIG. 10 is a flowchart illustrating an image compensation method by a post-processing circuit according to some example embodiments.
Figure 11:
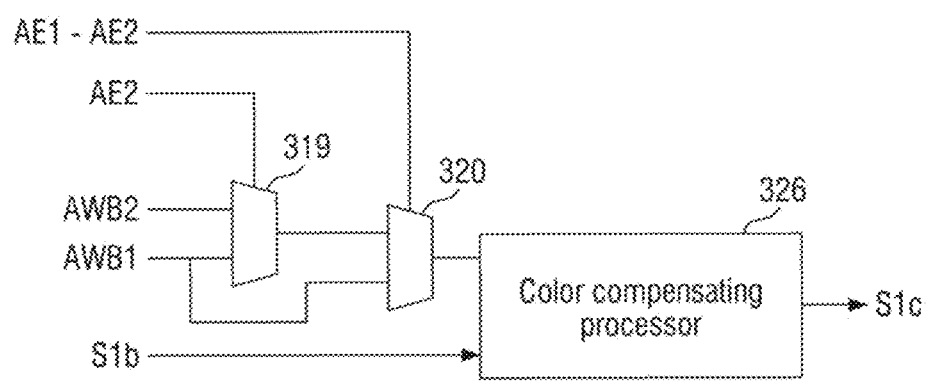
FIG. 11 is a block diagram illustrating the post-processing circuit of FIG. 8.
Figure 12:
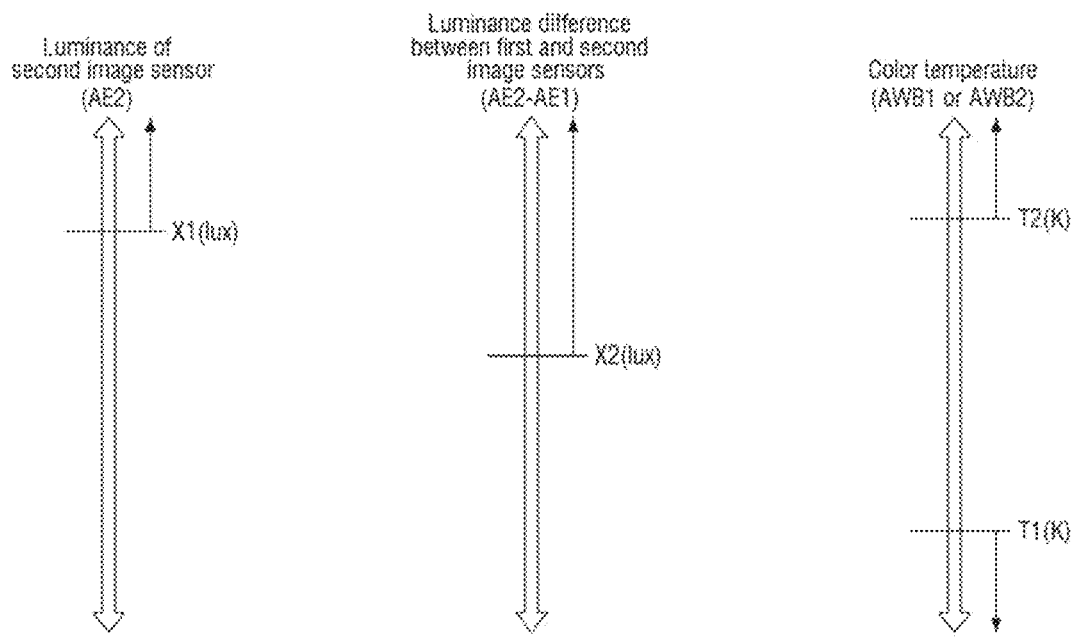
FIG. 12 is a diagram illustrating image compensation conditions according to some example embodiments.

FIG. 9 is a block diagram illustrating the post-processing circuit of FIG. 8. FIG. 10 is a flowchart illustrating an image compensation method by a post-processing circuit according to some example embodiments. FIG. 11 is a block diagram illustrating the post-processing circuit of FIG. 8. FIG. 12 is a diagram illustrating image compensation conditions according to some example embodiments.

Referring to FIG. 9, the post-processing circuit 321 may further include a second determining unit 319. For example, the AWB evaluation values AWB1 and AWB2 may be transmitted to the second determining unit 319 before transmitted to the color compensating processor 326. The AE evaluation value AE2 may also be transmitted to the second determining unit 319.

In this case, the AE evaluation value AE1 may include the luminance value of light sensed by the first image sensor 100 after passing through the display 20, and the AE evaluation value AE2 may include the luminance value of light sensed by the second image sensor 200 without passing through the display 20.

Further, the AWB evaluation value AWB1 may include the color temperature value of light sensed by the first image sensor 100 after passing through the display 20, and the AWB evaluation value AWB2 may include the color temperature value of light sensed by the second image sensor 200 without passing through the display 20.

Referring to FIGS. 9 and 10, the post-processing circuit 321 may receive signals from the first and second image sensors 100 and 200 (step S350). For example, the second determining unit 319 may receive the AE evaluation value AE2 and the AWB evaluation value AWB2 generated as the result of processing the signal sensed by the second image sensor 200. For example, the second determining unit 319 may receive the AWB evaluation value AWB1 and the second conversion signal S1*b* (or first conversion signal S1*a*) generated as the result of processing the signal sensed by the first image sensor 100.

The second determining unit 319 may determine whether the AE evaluation value AE2 is greater than a threshold value (step S351). In this case, the AE evaluation value AE2 may include the luminance value of light sensed by the second image sensor 200 without passing through the display 20. That is, when the environment where the electronic device 1 is exposed is bright, the AE evaluation value AE2 may have a higher value.

For example, referring to FIG. 12, in the case where the threshold value is X1 lux, and the AE evaluation value AE2 is greater than X1 lux (Yes at step S351), the determining unit 319 may transfer the AWB evaluation value AWB2 to the color compensating processor 326 (step S352). That is, when the environment where the electronic device 1 is exposed is sufficiently bright, the color compensating processor 326 may perform the color compensation using the AWB evaluation value AWB2 generated by sensing of the second image sensor 200 rather than using the AWB evaluation value AWB1 generated by sensing of the first image sensor 100.

When the first image sensor 100 senses the light passed through the display 20, information on the light may be distorted by the display 20 or the like. Therefore, when the AE evaluation value AE2 is greater than the threshold value, the color compensating processor 326 may perform the color compensation using the AWB evaluation value AWB2 generated by sensing of the second image sensor 200. In an example embodiment, the color compensating processor 326 may perform the color compensation using the AWB evaluation value AWB2 only when the AE evaluation value AE2 is greater than the threshold value.

As the AWB evaluation value AWB2 is used, a more accurate color temperature value may be used, thereby improving the image quality by the color compensating processor 326.

Referring back to FIG. 10, if the AE evaluation value AE2 is not greater than the threshold value (No at step S351), the determining unit 319 may transfer the AWB evaluation value AWB1 to the color compensating processor 326 (step S353). That is, when the environment where the electronic device 1 is exposed is not sufficiently bright, light sensed by the first image sensor 100 and light sensed by the second image sensor 200 may be significantly different. Accordingly, in this case, the color compensation may be performed using the AWB evaluation value AWB1 generated by sensing of the first image sensor 100.

After receiving one of the AWB evaluation values AWB1 and AWB2 from the determining unit 319, the color compensating processor 326 may compensate the second conversion signal S1*b* using the one of the AWB evaluation values AWB1 and AWB2.

The color compensating processor 326 may determine whether a color temperature value derived from a corresponding one of the AWB evaluation values AWB1 and AWB2 is in a boundary region or not (step S354). For example, when the color compensating processor 326 receives the AWB evaluation value AWB1 from the determining unit 319, the color compensating processor 326 may determine whether a color temperature value derived from the AWB evaluation value AWB1 is in the boundary region; and when the color compensating processor 326 receives the AWB evaluation value AWB2 from the determining unit 319, the color compensating processor 326 may determine whether a color temperature value derived from the AWB evaluation value AWB2 is in the boundary region.

Referring to FIG. 12, when the color temperature value derived from the corresponding one of the AWB evaluation values AWB1 and AWB2 is less than a first temperature T1 or greater than a second temperature T2, the color compensating processor 326 may compensate the second conversion signal S1*b*.

Referring back to FIG. 10, when the color temperature value derived from the corresponding one of the AWB evaluation values AWB1 and AWB2 is less than the first temperature T1 or greater than the second temperature T2 (No at step S354), the color compensating processor 326 may perform the color compensation (step S355). For example, when the color temperature value derived from the corresponding AWB evaluation value AWB1 or AWB2 is less than about 3,000 K, the color compensating processor 326 may compensate the second conversion signal S1*b* with a redder color. Further, for example, when the color temperature value derived from the corresponding AWB evaluation value AWB1 or AWB2 is greater than about 10,000 K, the color compensating processor 326 may compensate the second conversion signal S1*b* with a bluer color. However, embodiments of the disclosure are not limited thereto, and the color compensation method of the color compensating processor 326 may be performed in a different manner.

When the color temperature value derived from the corresponding one of the AWB evaluation values AWB1 and AWB2 is between the first temperature T1 and the second temperature T2 (Yes at step S354), the color compensating processor 326 may complete the process without performing the color compensation.

By causing the color compensating processor 326 to perform the color compensation on the second conversion signal S1b, the quality of the image corresponding to the second conversion signal S1b may be improved. Since the first image signal processor 310 performs the color compensation using the AWB evaluation value AWB2, which is generated by the second image sensor 200 and the second image signal processor 330, only under a specific condition (for example, in an outdoor environment which is sufficiently bright), accurate compensation may be performed.

Referring back to FIG. 9, the color compensating processor 326 may output the third conversion signal S1c which has been subjected to the color compensation. The third conversion signal S1c may be transmitted to the first determining unit 318 of FIG. 8.

Referring to FIG. 11, the post-processing circuit 321 may further include a third determining unit 320. For example, the signal outputted from the second determining unit 319 described with reference to FIGS. 9 and 10 may be transmitted to the third determining unit 320. Further, the AWB evaluation value AWB1 may be transmitted to the third determining unit 320.

The third determining unit 320 may determine which of the AWB evaluation value AWB1 and the AWB evaluation value AWB2 is to be transmitted to the color compensating processor 326, based on the difference between the AE evaluation values AE1 and AE2 (e.g., |AE1-AE2|).

For example, when the AE evaluation value AE2 is greater than the AE evaluation value AE1 by a certain difference or more (for example, when the luminance of light incident on the rear surface of the electronic device 1 is greater than the luminance of light incident on the front surface of the electronic device 1), the third determining unit 320 may transmit the AE evaluation value AE1 to the color compensating processor 326. Further, when the AE evaluation value AE2 is almost the same as the AE evaluation value AE1 (for example, the luminance of light incident on the rear surface of the electronic device 1 is similar to the luminance of light incident on the front surface of the electronic device 1), the third determining unit 320 may transmit the AE evaluation value AE2 received from the second determining unit 319 to the color compensating processor 326.

Referring to FIG. 12, for example, when the difference between the AE evaluation value AE2 and the AE evaluation value AE1 is equal to or greater than X2 lux, the third determining unit 320 may transmit the AE evaluation value AE1 to the color compensating processor 326. Alternatively, when the difference between the AE evaluation value AE2 and the AE evaluation value AE1 is less than X2 lux, the third determining unit 320 may transmit the AE evaluation value AE2 received from the second determining unit 319 to the color compensating processor 326.

That is, when the difference between the luminance of light incident on the front surface, which is measured by the first image sensor 100, and the luminance of light incident on the rear surface, which is measured by the second image sensor 200, is greater by a certain difference or more, the color compensating processor 326 may perform the color compensation using the AE evaluation value AE1, rather than the AE evaluation value AE2. In this manner, color compensation may be performed on the image by using the AE evaluation value AE2 upon satisfaction of a preset condition.

Figure 13:
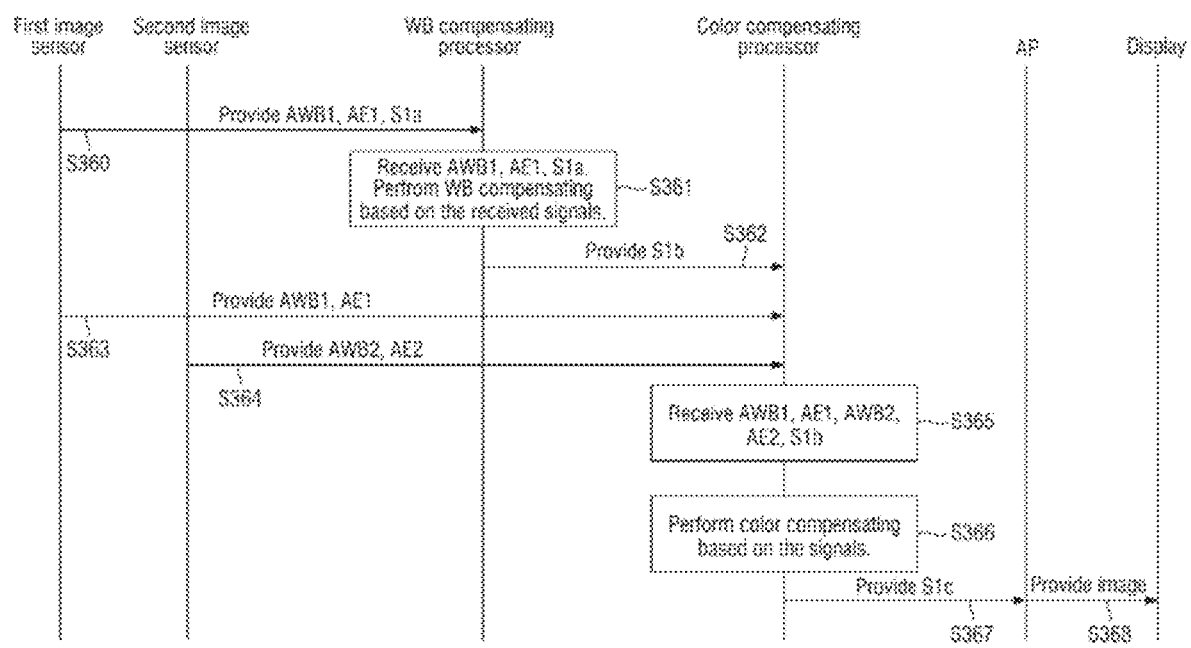
FIG. 13 is a diagram describing an operation of an electronic device according to some example embodiments.

FIG. 13 is a diagram describing an operation of an electronic device according to some example embodiments.

Referring to FIG. 13, signals may be transmitted between the first image sensor 100, the second image sensor 200, the white balance compensating processor 325, the color compensating processor 326, the application processor 300, and the display 20 that are included in the electronic device 1.

The first image sensor 100 may provide the AWB evaluation value AWB1, the AE evaluation value AE1, and the first conversion signal S1a to the white balance compensating processor 325 (step S360). For example, the AWB evaluation value AWB1, the AE evaluation value AE1, and the first conversion signal S1a may be generated by the pre-processing circuit 311 and transmitted to the white balance compensating processor 325 of the post-processing circuit 321.

The white balance compensating processor 325 may receive the AWB evaluation value AWB1, the AE evaluation value AE1, and the first conversion signal S1a, and perform the white balance compensation on the first conversion signal S1a based on the AWB evaluation value AWB1. Through this, the white balance compensating processor 325 may generate the second conversion signal S1b (step S361).

The white balance compensating processor 325 may provide the generated second conversion signal S1b to the color compensating processor 326 (step S362).

The first image sensor 100 may provide the AWB evaluation value AWB1 and the AE evaluation value AE1 to the color compensating processor 326 (step S363).

The second image sensor 200 may provide the AWB evaluation value AWB2 and the AE evaluation value AE2 to the color compensating processor 326 (step S364). For example, the AWB evaluation value AWB2 and the AE evaluation value AE2 may be generated by the pre-processing circuit 331 and transmitted to the color compensating processor 326 of the post-processing circuit 321.

The color compensating processor 326 may receive the AE evaluation values AE1 and AE2, the AWB evaluation values AWB1 and AWB2, and the second conversion signal S1b (step S365).

The color compensating processor 326 may perform the color compensation on the second conversion signal S1b based on the received signals (step S366). For example, the color compensation processing of the color compensating processor 326, which is described with reference to FIGS. 8 to 12, may be performed. Through this, the color compensating processor 326 may generate the third conversion signal S1c.

The color compensating processor 326 may provide the third conversion signal S1c to the application processor 300 (step S367). For example, the application processor 300 may receive the third conversion signal S1c. For example, a display driving circuit included in the application processor 300 may generate an image signal using the third conversion signal S1c.

The application processor 300 may provide the generated image signal to the display 20 (step S368). For example, the image signal generated by the display driving circuit may be transmitted to the display 20. As a result, the display 20 may output an image based on the image signal.

Hereinafter, an image sensing system according to some other example embodiments will be described with reference to FIG. 14.

Figure 14:
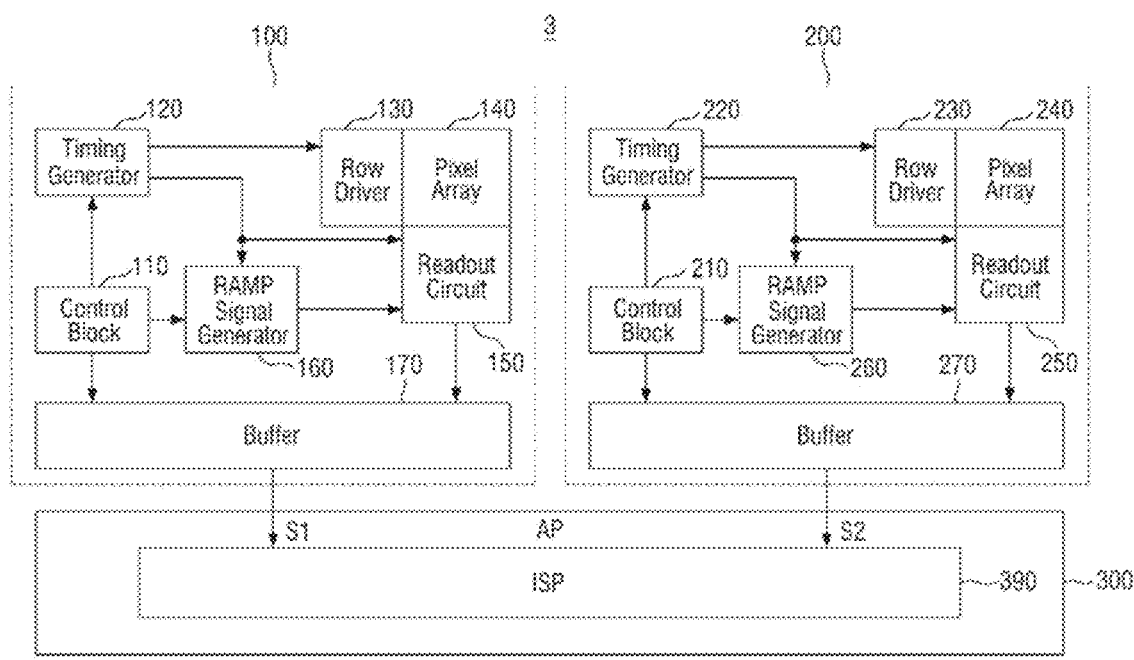
FIG. 14 is a block diagram illustrating an image sensing system according to some other example embodiments.

FIG. 14 is a block diagram illustrating an image sensing system according to some other embodiments. For simplicity of description, a description overlapping with the description with reference to FIGS. 1 to 13 will be briefly given or omitted.

Referring to FIG. 14, an image sensing system 3 may include the first image sensor 100, the second image sensor 200, and the application processor 300.

The first image sensor 100 may generate the first image signal S1 by sensing an image of a sensing target using incident light. For example, the first image sensor 100 may sense light passed through the display 20 and generate the first image signal S1.

The second image sensor 200 may generate the second image signal S2 by sensing the image of a sensing target using incident light. For example, the second image sensor 200 may generate the second image signal S2 by sensing light that does not pass through the display 20.

The first and second image signals S1 and S2 may be provided to and processed by an application processor 300. For example, the first and second image signals S1 and S2 may be provided to and processed by an image signal processor 390 included in the application processor 300.

The image signal processor 390 may process the first image signal S1 and the second image signal S2 as described with reference to FIGS. 5 to 13.

For example, when processing the first image signal S1, the signal generated as the result of processing the second image signal S2 may be used under certain conditions. That is, when processing the first image signal S1, the signal generated by processing the second image signal S2 may be shared in the image signal processor 390. Further, when processing the second image signal S2, the signal generated by processing the first image signal S1 may be shared in the image signal processor 390.

That is, the processing steps performed by the first image signal processor 310 and the second image signal processor 330 of the image sensing system 2 described with reference to FIGS. 5 to 13 may be performed by the image signal processor 390 of the image sensing system 3 of FIG. 14.

In this case, the shared signals are not limited to the signals generated based on the first image signal S1 and the second image signal S2, and may include various other information. For example, the shared signals may include a signal for high dynamic range (HDR) processing on a plurality of image data.

Hereinafter, an electronic device according to some other embodiments will be described with reference to FIGS. 15 and 16.

Figure 15:
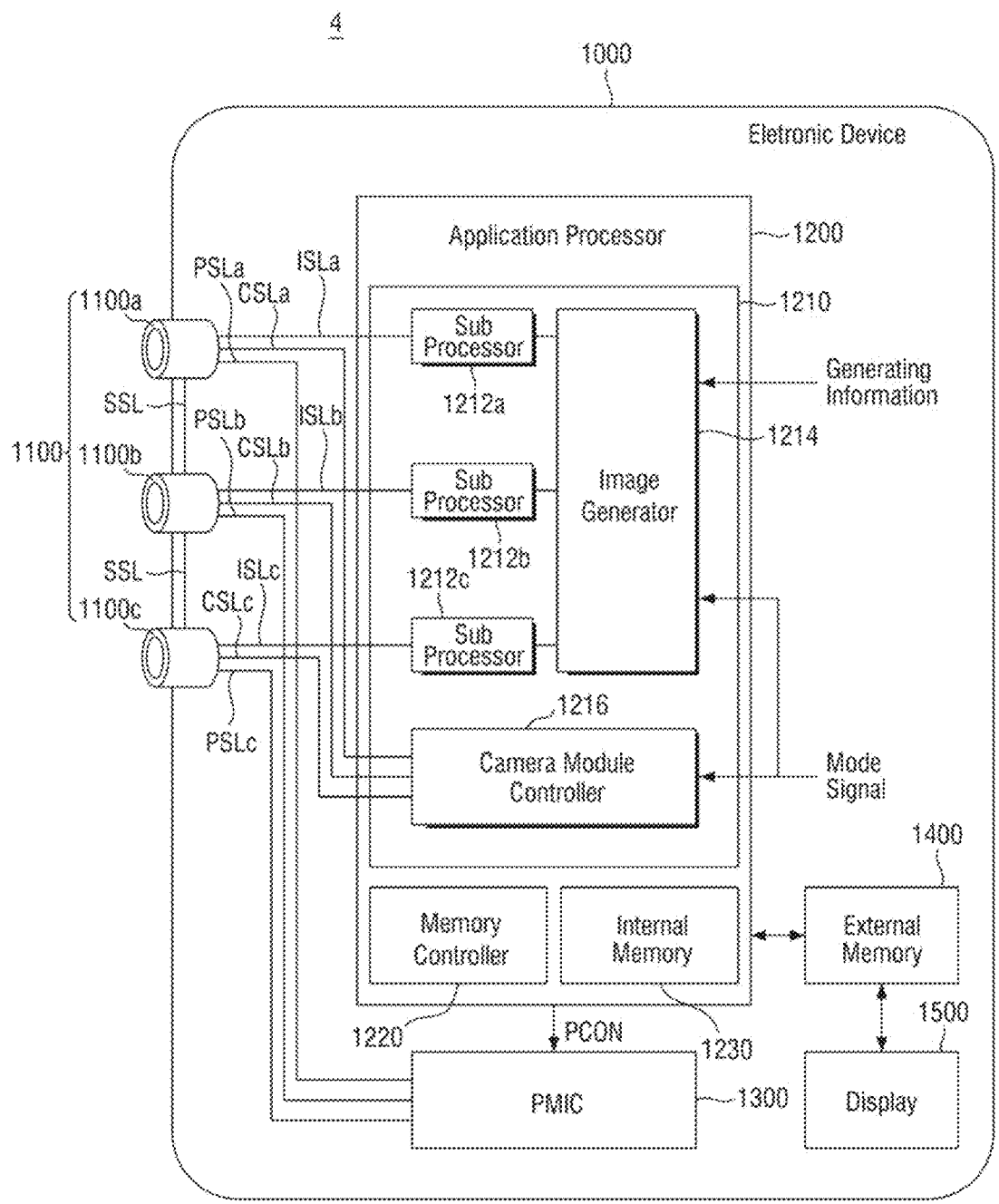
FIG. 15 is a block diagram for describing an electronic device including a multi-camera module according to some example embodiments.

FIG. 15 is a block diagram for describing an electronic device 1000 including a multi-camera module according to some embodiments. FIG. 16 is a detailed block diagram of the camera module of FIG. 15. For simplicity of description, a description overlapping with the description with reference to FIGS. 1 to 14 will be briefly given or omitted.

Referring to FIG. 15, an image sensing system 4 includes the electronic device 1000, and the electronic device 1000 may include a camera module group 1100, an application processor 1200, a power management integrated circuit (PMIC) 1300, an external memory 1400, and a display 1500.

The camera module group 1100 may include a plurality of camera modules 1100a, 1100b, and 1100c. Although the drawing illustrates an embodiment in which three camera modules 1100a, 1100b, and 1100c are disposed, embodiments are not limited thereto. In some embodiments, the camera module group 1100 may be modified to include only two camera modules. In addition, in some embodiments, the camera module group 1100 may be modified to include n (n is a natural number greater than 3) camera modules.

In this embodiment, one of the three camera modules 1100a, 1100b, and 1100c may be a camera module including the first image sensor 100 described with reference to FIGS. 1 to 14. For example, the camera module 1100b may be a camera module including the first image sensor 100 and may be disposed toward the front surface of the electronic device 1 or 4. In addition, the camera module 1100b may be covered by the display 20 or the display 1500, and may sense incident light through the display 20 or 1500.

Hereinafter, a detailed configuration of the camera module 1100b will be described with reference to FIG. 16. The following description may be equally applied to other camera modules 1100a and 1100c according to embodiments.

Figure 16:
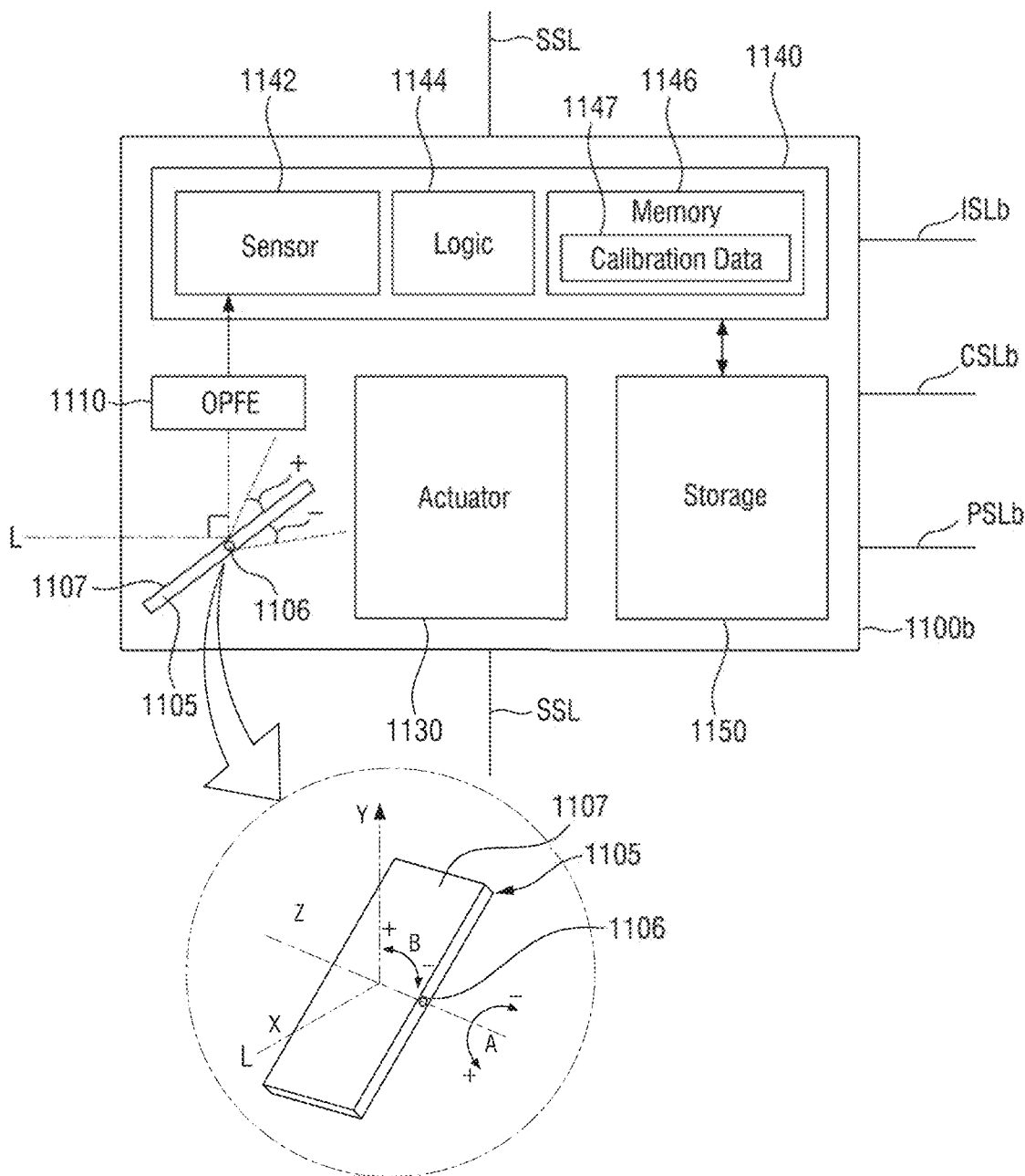
FIG. 16 is a detailed block diagram of the camera module of FIG. 15.

Referring to FIG. 16, the camera module 1100b may include a prism 1105, an optical path folding element (hereinafter, referred to as "OPFE") 1110, an actuator 1130, an image sensing unit 1140, and a storage unit 1150.

The prism 1105 may include a reflective surface 1107 having a light reflecting material and change the path of light L incident from the outside.

In some embodiments, the prism 1105 may change the path of the light L incident in a first direction X to a second direction Y perpendicular to the first direction X. Further, the prism 1105 may rotate the reflective surface 1107 having the light reflecting material with respect to a central axis 1106 in an A direction, or rotate the central axis 1106 in a B direction, thereby changing the path of the light L incident in the first direction X to the second direction Y perpendicular thereto. In this case, the OPFE 1110 may also move in a third direction Z perpendicular to the first direction X and the second direction Y.

In some embodiments, as shown in the drawing, the maximum rotation angle of the prism 1105 in the A direction may be 15 degrees or less in the positive (+) A direction and greater than 15 degrees in the negative (−) A direction. However, embodiments are not limited thereto.

In some embodiments, the prism 1105 may move about 20 degrees, between 10 and 20 degrees, or between 15 and 20 degrees in the positive (+) or negative (−) B direction. In this case, the moving angle may be the same in the positive (+) or negative (−) B direction or may be almost the same in the positive (+) or negative (−) B directions with a difference of about 1 degree.

In some embodiments, the prism 1105 may move the reflective surface 1107 having the light reflecting material in the third direction (e.g., direction Z) parallel to the extending direction of the central axis 1106.

The OPFE 1110 may include, for example, m (m is a natural number) optical lenses. The m lenses may move in the second direction Y to change an optical zoom ratio of the camera module 1100b. For example, if it is assumed that a basic optical zoom ratio of the camera module 1100b is Z, the optical zoom ratio of the camera module 1100b may become 3 Z, 5 Z or more as the m optical lenses included in the OPFE 1110 are moved.

The actuator 1130 may move the optical lenses or the OPFE 1110 (hereinafter, referred to as "optical lens") to a specific position. For example, the actuator 1130 may adjust the position of the optical lens so that an image sensor 1142 may be positioned at a focal length of the optical lens for accurate sensing.

The image sensing unit 1140 may include the image sensor 1142, a control logic 1144, and a memory 1146. The image sensor 1142 may sense an image of a sensing target using the light L provided through the optical lens. In some embodiments, the image sensor 1142 may include at least one of the image sensors 100 and 200 described above.

The control logic 1144 may control the overall operation of the camera module 1100b. For example, the control logic 1144 may control the operation of the camera module 1100b according to a control signal provided through a control signal line CSLb.

The memory 1146 may store information such as calibration data 1147 that is used for the operation of the camera module 1100b. The calibration data 1147 may include information used for the camera module 1100b to generate image data using the light L provided from the outside. The calibration data 1147 may include, for example, information on an optical axis, information on the degree of rotation, and information on the focal length described above. When the camera module 1100b is implemented in the form of a multi-state camera whose focal length varies according to the position of the optical lens, the calibration data 1147 may include information on auto focusing and a focal length value for each position (or state) of the optical lens.

The storage unit 1150 may store image data sensed through the image sensor 1142. The storage unit 1150 may be disposed outside the image sensing unit 1140, and may be implemented in a form of being stacked with a sensor chip constituting the image sensing unit 1140. In some embodiments, the storage unit 1150 may be implemented as an Electrically Erasable Programmable Read-Only Memory (EEPROM), but embodiments are not limited thereto.

Referring to FIGS. 15 and 16 together, in some embodiments, each of the camera modules 1100a, 1100b, and 1100c may include the actuator 1130. Accordingly, the camera modules 1100a, 1100b, and 1100c may respectively include the calibration data 1147 that are the same or different according to the operation of the actuators 1130 included therein.

In some embodiments, one camera module (e.g., camera module 1100b) among the camera modules 1100a, 1100b and 1100c may be a camera module of a folded lens type including the prism 1105 and the OPFE 1110 described above, and the remaining camera modules (e.g., camera modules 1100a and 1100c) may be camera modules of a vertical type, which do not include the prism 1105 and the OPFE 1110. However, embodiments are not limited thereto.

In some embodiments, one camera module (e.g., camera module 1100c) among the camera modules 1100a, 1100b and 1100c may be a depth camera of a vertical type that extracts depth information using, for example, infrared rays (IR). In this case, the application processor 1200 may merge image data provided from the depth camera with image data provided from another camera module (e.g., camera module 1100a or 1100b) to generate a three dimensional (3D) depth image.

In some embodiments, among the camera modules 1100a, 1100b, and 1100c, at least two camera modules (e.g., camera modules 1100a and 1100c) may have different fields of view (viewing angles). In this case, among the camera modules 1100a, 1100b, and 1100c, for example, at least two camera modules (e.g., camera modules 1100a and 1100c) may have different optical lenses, but are not limited thereto.

Further, in some embodiments, the camera modules 1100a, 1100b, and 1100c may have different viewing angles. In this case, optical lenses included in the respective camera modules 1100a, 1100b, and 1100c may also be different, but the disclosure is not limited thereto.

In some embodiments, the camera modules 1100a, 1100b, and 1100c may be disposed to be physically separate from each other. That is, the sensing area of one image sensor 1142 is not divided and used by all of the camera modules 1100a, 1100b, and 1100c, but an independent image sensor 1142 may be disposed inside each of the camera modules 1100a, 1100b, and 1100c.

In some embodiments, for example, the image sensor 1142 included in the camera module 1100a may have the image sensor 200 described above, and the image sensor 1142 included in the camera module 1100b may have the image sensor 100 described above.

Referring back to FIG. 15, the application processor 1200 may include an image processing unit 1210, a memory controller 1220, and an internal memory 1230. The application processor 1200 may be implemented separately from the camera modules 1100a, 1100b, and 1100c. For example, the application processor 1200 and the camera modules 1100a, 1100b, and 1100c may be implemented separately as separate semiconductor chips.

The image processing unit 1210 may include a plurality of sub-image processors 1212a, 1212b, and 1212c, an image generator 1214, and a camera module controller 1216. In some embodiments, the image processing unit 1210 may include the first image signal processor 310, the second image signal processor 330, and the image signal processor 390 described above.

The image processing unit 1210 may include the sub-image processors 1212a, 1212b, and 1212c, the number of which corresponds to the number of the camera modules 1100a, 1100b, and 1100c. In some embodiments, each of the sub-image processors 1212a, 1212b, and 1212c may include one of the first image signal processor 310, the second image signal processor 330, and the image signal processor 390 described above.

Image data generated from the respective camera modules 1100a, 1100b, and 1100c may be provided to the corresponding sub-image processors 1212a, 1212b, and 1212c through separate image signal lines ISLa, ISLb, and ISLc. For example, image data generated from the camera module 1100a may be provided to the sub-image processor 1212a through the image signal line ISLa, image data generated from the camera module 1100b may be provided to the sub-image processor 1212b through the image signal line ISLb, and image data generated from the camera module 1100c may be provided to the sub-image processor 1212c through the image signal line ISLc. For example, such image data transmission may be performed using a camera serial interface (CSI) based on a mobile industry processor interface (MIPI), but embodiments are not limited thereto.

In some embodiments, one sub-image processor may be arranged to correspond to a plurality of camera modules. For example, the sub-image processor 1212a and the sub-image processor 1212c may be integrated into one sub-image processor without being separate from each other as shown, and image data provided from the camera module 1100a and the camera module 1100c may be selected by a data selector (e.g., multiplexer) or the like, and then provided to the integrated sub-image processor.

The image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generation information or a mode signal. In some embodiments, the image generator 1214 may include the post-processing circuit 321 described above. The image generator 1214 may perform the above-described compensation process.

Specifically, according to the image generation information or the mode signal, the image generator 1214 may generate an output image by merging at least some of the image data generated from the camera modules 1100a, 1100b and 1100c having different viewing angles. Further, according to the image generation information or the mode signal, the image generator 1214 may generate an output image by selecting any one of image data generated from camera modules 1100a, 1100b and 1100c having different viewing angles.

In some embodiments, the image generation information may include a zoom signal (or zoom factor). Further, in some embodiments, the mode signal may be a signal based on, for example, a mode selected by a user.

When the image generation information is a zoom signal (zoom factor), and the camera modules 1100a, 1100b, and 1100c have different fields of view (viewing angles), the image generator 1214 may perform a different operation depending on the type of the zoom signal. For example, when the zoom signal is a first signal, image data outputted from the camera module 1100a may be merged with image data outputted from the camera module 1100c, and then an output image may be generated using the merged image signal and image data that is outputted from the camera module 1100b that is not used for merging. When the zoom signal is a second signal that is different from the first signal, the image generator 1214 does not perform the image data merging, but may generate an output image by selecting any one of image data outputted from the camera module 1100a, 1100b, and 1100c. However, embodiments are not limited thereto, and the method of processing image data may be variously modified as needed.

In some embodiments, the image generator 1214 may receive a plurality of image data having different exposure times from at least one of the sub-image processors 1212a, 1212b, and 1212c, and perform the high dynamic range (HDR) processing on the plurality of image data, thereby generating merged image data with an increased dynamic range.

The camera module controller 1216 may provide a control signal to each of the camera modules 1100a, 1100b, and 1100c. The control signals generated from the camera module controller 1216 may be provided to the corresponding camera modules 1100a, 1100b, and 1100c through separate control signal lines CSLa, CSLb, and CSLc.

Any one (e.g., camera module 1100a) of the camera modules 1100a, 1100b and 1100c may be designated as a master camera according to the mode signal or the image generation information including the zoom signal, and the remaining camera modules (e.g., camera modules 1100b and 1100c) may be designated as slave cameras. Such information may be included in the control signals to be provided to the corresponding camera modules 1100a, 1100b, and 1100c through the separate control signal lines CSLa, CSLb, and CSLc.

The camera modules operating as the master and the slaves may be changed according to the zoom factor or the operation mode signal. For example, when the viewing angle of the camera module 1100a is wider than the viewing angle of the camera module 1100c and the zoom factor indicates a low zoom ratio, the camera module 1100c may operate as a master, and the camera module 1100a may operate as a slave. On the contrary, when the zoom factor indicates a high zoom ratio, the camera module 1100a may operate as a master, and the camera module 1100c may operate as a slave.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b having received the sync enable signal may generate a sync signal based on the received sync enable signal, and transmit the generated sync signal to the camera modules 1100a and 1100c through sync signal lines SSL. Based on the sync signal, the camera modules 1100a, 1100b and 1100c may synchronously transmit image data to the application processor 1200.

In some embodiments, the control signal provided from the camera module controller 1216 to the camera modules 1100a, 1100b, and 1100c may include mode information according to the mode signal. Based on the mode information, the camera modules 1100a, 1100b, and 1100c may operate in a first operation mode or a second operation mode in relation to a sensing rate.

In the first operation mode, the camera modules 1100a, 1100b, and 1100c may generate an image signal at a first rate (e.g., first frame rate), and encode the image signal at a second rate (e.g., second frame rate higher than first frame rate) higher than the first rate, and transmit the encoded image signal to the application processor 1200. In this case, the second rate may be 30 times or less the first rate.

The application processor 1200 may store the received image signal, that is, the encoded image signal, in the memory 1230 provided therein or in a storage 1400 provided outside the application processor 1200. Then, the application processor 1200 may read out the encoded image signal from the memory 1230 or the storage 1400 to decode the encoded image signal, and display image data generated based on the decoded image signal. For example, a corresponding sub-processor among the sub-image processors 1212a, 1212b, and 1212c of the image processing unit 1210 may perform decoding and may also perform image processing on the decoded image signal. For example, the image data generated based on the decoded image signal may be displayed on the display 1500.

In the second operation mode, the camera modules 1100a, 1100b, and 1100c may generate an image signal at a third rate (e.g., third frame rate lower than first frame rate) lower than the first rate and transmit the image signal to the application processor 1200. The image signal provided to the application processor 1200 may be an unencoded signal. The application processor 1200 may perform image processing on the received image signal or store the image signal in the memory 1230 or the storage 1400.

The PMIC 1300 may supply power, such as a source voltage, to each of the camera modules 1100a, 1100b, and 1100c. For example, the PMIC 1300 may supply first power to the camera module 1100a through a power signal line PSLa, second power to the camera module 1100b through a power signal line PSLb and third power to the camera module 1100c through a power signal line PSLc under the control of the application processor 1200.

The PMIC 1300 may generate power corresponding to each of the camera modules 1100a, 1100b, and 1100c in response to a power control signal PCON from the application processor 1200, and may also adjust a power level. The power control signal PCON may include a power adjustment signal for each operation mode of the camera modules 1100a, 1100b, and 1100c. For example, the operation mode may include a low power mode, and in this case, the power control signal PCON may include information on a camera module to operate in the low power mode and a set power level. Levels of powers provided to the respective camera modules 1100*a*, 1100*b*, and 1100*c* may be the same or different. Further, the levels of powers may be dynamically changed.

The disclosure may be implemented as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments for implementing the disclosure may be easily deduced by programmers of ordinary skill in the art.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to embodiments thereof, it will be understood that various changes in form and details may be made therein without departing from the spirit and scope of the following claims.

What is claimed is:

1. An electronic device comprising:
a display;
a first image sensor configured to output a first image signal based on sensing a first light passing through the display;
a second image sensor configured to output a second image signal based on sensing a second light that does not pass through the display; and
a processor configured to:
generate a first optical value and a second optical value based on the second image signal, the second optical value being different from the first optical value, and
based on the first optical value satisfying a first condition, correct the first image signal by using the second optical value.

2. The electronic device of claim 1, wherein the first optical value includes at least one of a luminance value or an illuminance value generated based on the second image signal, and
wherein the second optical value includes a color temperature value generated based on the second image signal.

3. The electronic device of claim 2, wherein the processor is further configured to, based on the first optical value satisfying the first condition and further based on the color temperature value being less than a first color temperature or being equal to or greater than a second color temperature, correct the first image signal by using the color temperature value, the second color temperature being higher than the first color temperature.

4. The electronic device of claim 1, wherein the processor is further configured to generate a third optical value and a fourth optical value based on the first image signal, the fourth optical value being different from the third optical value.

5. The electronic device of claim 4, wherein the third optical value includes at least one of a luminance value or an illuminance value generated based on the first image signal, and
wherein the fourth optical value includes a color temperature value generated based on the first image signal.

6. The electronic device of claim 1, wherein the first condition is that the first optical value is equal to or greater than a threshold value.

7. The electronic device of claim 1, wherein the processor is further configured to, based on the first optical value not satisfying the first condition, correct the first image signal by using an optical value generated based on the first image signal.

8. The electronic device of claim 7, wherein the optical value generated based on the first image signal includes a color temperature value generated based on the first image signal.

9. The electronic device of claim 4, wherein the first condition is that a difference between the first optical value and the third optical value is less than a threshold value.

10. The electronic device of claim 9, wherein the processor is further configured to, based on the difference between the first optical value and the third optical value being equal to or greater than the threshold value, correct the first image signal by using an optical value generated based on the first image signal.

11. The electronic device of claim 1, wherein the display is further configured to output an image generated based on the corrected first image signal.

12. The electronic device of claim 1, wherein the processor is further configured to output a third image signal by performing auto white balance on the first image signal, and
wherein the processor is further configured to, based on the first optical value satisfying a second condition, output a fourth image signal obtained by correcting the third image signal using the second optical value.

13. The electronic device of claim 12, wherein the display is further configured to output an image generated based on at least one of the third image signal or the fourth image signal.

14. An electronic device, comprising:
a first image sensor configured to output a first image signal based on sensing a first light incident to a front surface of the electronic device;
a second image sensor configured to output a second image signal based on sensing a second light incident to a rear surface of the electronic device;
a processor configured to receive the first image signal and the second image signal; and
a display disposed on the front surface and configured to output an image generated based on the first image signal,
wherein the processor is further configured to generate a first color temperature value based on the second image signal, and based on a first condition being satisfied, correct the first image signal by using the first color temperature value.

15. The electronic device of claim 14, wherein the display is further configured to cover the first image sensor.

16. The electronic device of claim 14, wherein the processor is further configured to generate a second color temperature value based on the first image signal, and generate at least one of a luminance value or an illuminance value based on the second image signal.

17. The electronic device of claim 16, wherein the first condition is that the at least one of the luminance value or the illuminance value is equal to or greater than a threshold value.

18. The electronic device of claim 16, wherein the processor is further configured to, based on the first condition not being satisfied, correct the first image signal by using the second color temperature value.

19. The electronic device of claim 14, wherein the display is further configured to output an image generated based on the corrected first image signal.

20. An electronic device comprising:
a display;
a first camera module including a first image sensor that is configured to output a first image signal based on sensing a first light passing through the display;
a second camera module including a second image sensor that is configured to output a second image signal based on sensing a second light that does not pass through the display; and
an application processor disposed separately from the first camera module and the second camera module, the application processor including an image signal processor,
wherein the image signal processor is configured to:
receive the first image signal from the first camera module through a first camera serial interface,
receive the second image signal from the second camera module through a second camera serial interface,
generate a first color temperature value based on the first image signal,
generate, based on the second image signal, at least one of a luminance value or an illuminance value, and a second color temperature value, and
correct the first image signal based on the second color temperature value based on the at least one of the luminance value or the luminance value being equal to or greater than a threshold value, and correct the first image signal based on the first color temperature value based on the at least one of the luminance value or the illuminance value being less than the threshold value.

* * * * *